April 22, 1952

A. W. FRIEND 2,594,006

VOLTAGE POWER SUPPLY

Filed Sept. 16, 1949

INVENTOR
Albert W. Friend
BY
Conder C. Henry
ATTORNEY

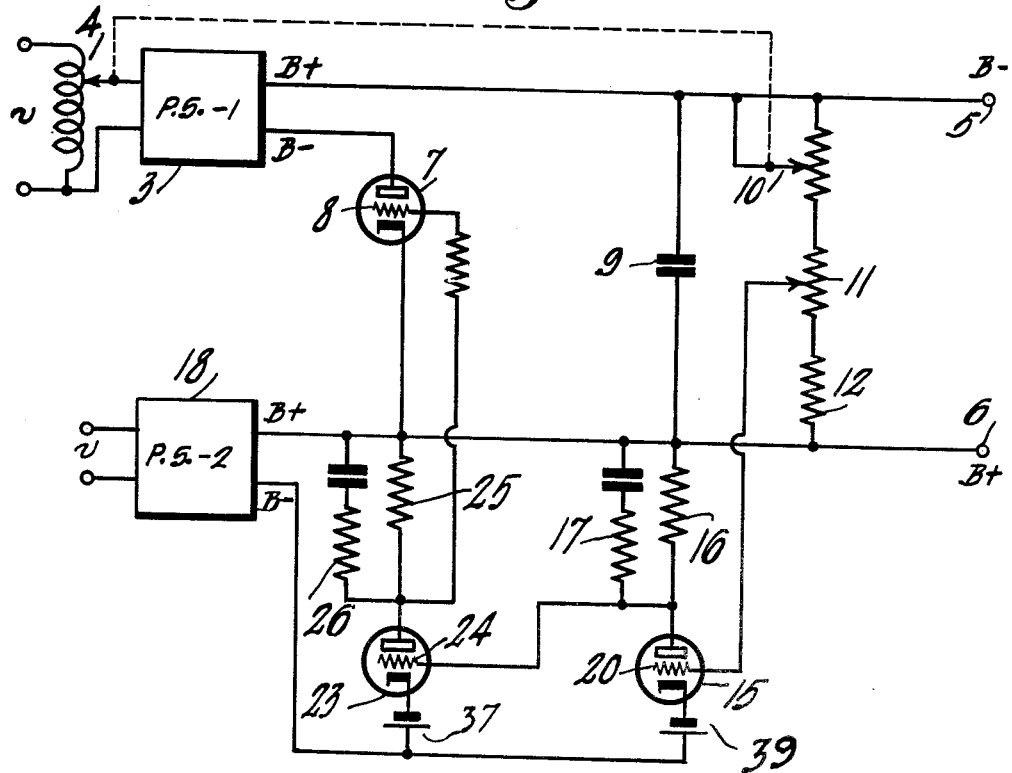
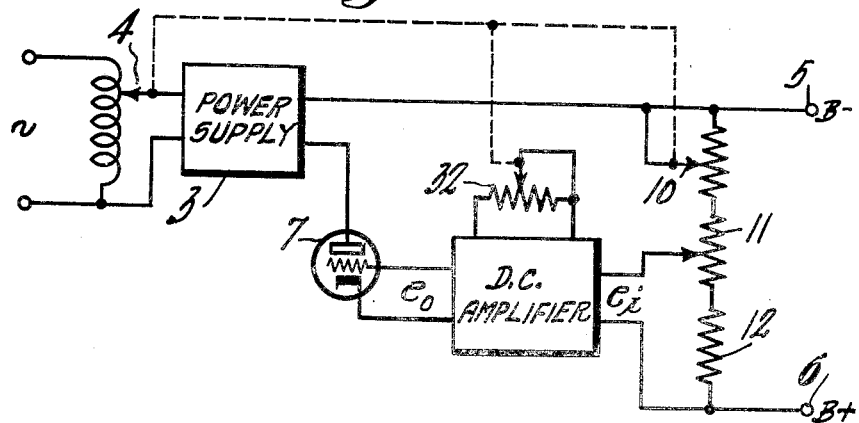

Patented Apr. 22, 1952

2,594,006

UNITED STATES PATENT OFFICE 2,594,006

VOLTAGE POWER SUPPLY

Albert W. Friend, Princeton, N. J., assignor to Radio Corporation of America, a corporation of Delaware Application September 16, 1949, Serial No. 116,199

5 Claims. (Cl. 323—22)

This invention relates to an improved power supply and more particularly it relates to a stabilized voltage power supply which is variable over a wide range of values.

Heretofore power supplies have normally been adjusted to achieve maximum stability at only one point of operation and when a variable power supply was needed the variability was usually achieved at the expense of stability of the resulting output voltage. At most such prior art circuits having variable voltage output have been restricted in stability to a very narrow range of output voltages.

It is particularly important in many instances to supply a variable voltage which is stable over a wide range of variation. One example of such a requisite would occur in a circuit using a photo multiplier tube. Such a tube to operate at maximum efficiency must have equal potential differences of a particular value supplied to its respective dynodes. Should the supply potential vary even slightly it is readily seen that there is not only a considerable change in output characteristics but also in the operation and efficiency of the tube.

My invention in general then provides stability of output voltage over a wide range of voltage control by utilizing a ganged variable control in both the input voltage circuit and the stabilizing tube circuit. Basically this operates to change the constants of the stabilizing circuit in such a manner that required degree of stability is maintained throughout a large range of output voltage variation.

It is accordingly an object of my invention to provide means for attaining voltage regulation and stability of a power supply having a variable output voltage.

It is another object of my invention to provide a method of varying output voltage over a wide range of values without affecting stability of the resulting output voltage.

The above and other objects of my invention will become apparent upon a consideration of the following detailed description taken in conjunction with the accompanying drawings in which like reference characters in the respective views refer to like circuit components and in which:

Fig. 1 schematically represents a preferred embodiment of my invention,

Fig. 2 shows a simplified circuit diagram of my invention, and

Fig. 3 is a modification of Fig. 2.

Figure 1:
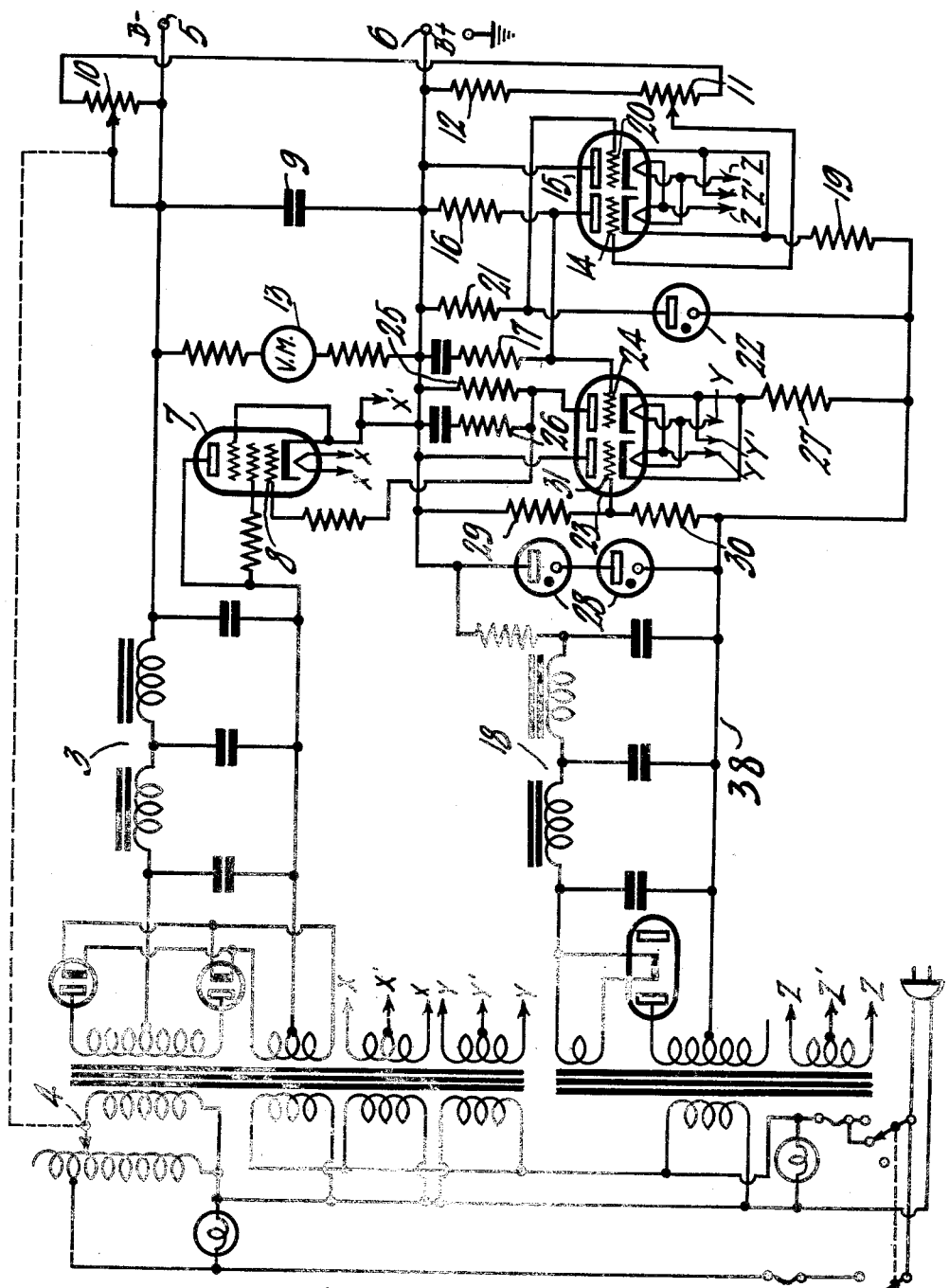

Referring more particularly to Fig. 1 we have shown a D. C. power supply 3, having a variable input control 4, output voltage terminals 5 and 6, and a series regulator tube 7, having a control electrode 8. A capacitor 9 is connected across the output terminals in shunt with the resistor combination 10, 11 and 12. Also a voltmeter 13 is connected between the output terminals. Resistor 10 is variable and its control arm is ganged with the input control arm 4. A tap is taken from resistor 11 to the control electrode 14 of the left hand section of a twin triode 15. The plate load resistor 16 and a shunt resistor capacitor combination 17 is connected from the anode of the left side of tube 15 to the output terminal 6. A second D. C. power supply 18 has a common B+ connection with the first supply at terminal 6, and has its B— terminal 38 connected through a resistor 19 to the two cathodes of the tube 15. The right hand section of tube 15 has its anode connected to the common B+ terminal 6, and has its control electrode 20 connected to the junction of a resistor 21, voltage regulator tube 22, series combination, which combination is across the output of the second D. C. supply 18. A second twin triode 23 has its right hand control electrode 24 connected to the output resistor 16 of the first twin triode 15. Connections are made from B+ to the left anode of tube 23, and through a load resistor 25 to the right hand anode, which resistor 25 has a resistor capacitor series combination 26 connected in shunt therewith. Resistor 27 is connected between the B— terminal 18, and the two cathodes of the second twin triode 23. Two series voltage regulators 28 are across the output of the second supply 18, and are shunted by two series resistors 29 and 30 to the junction of which the left hand control electrode 31 of the second twin triode is connected. Load resistor 25 is connected to the control electrode 8 of the series regulator tube 7.

Operation of the circuit shown in Fig. 1 will be made clear in the following description. A rectifier and filter system 3 is provided for the development of somewhat more than the maximum required output voltage at a value of current slightly greater than the maximum desired load current. A series regulator tube 7 is provided according to present general practice, with control of its conducting condition effected by means of a D. C. voltage amplifier system of any appropriate design, in this case embodied in the circuits of the two twin triodes 15 and 23. This D. C. amplifier is to be operated from a separate power supply source 18. The latter power supply should be stabilized by separate means, shown in this arrangement as shunted voltage regulator tubes 28.

The output voltage level of the main power supply 3 may be controlled by any convenient means such as the variable transformer 4, connected to its input terminals. It is to be recognized that with a stabilizing system such as connected to the control electrode 8, of the series regulator tube 7, there is only one input voltage at which stable operation will be accomplished with a particular setting of the tap on resistor 11. In my system, however, I have provided a potentiometer 10, and mechanically ganged the shaft with that of the variable transformer 4, for simultaneous operation. Then by choosing proper values for the resistance network 10, 11 and 12, the correct operating characteristic of the stabilizing circuit is provided for all values of output voltage.

If a constant output impedance is required for the stabilized power supply system, a gain control of any standard type may be applied to the D. C. amplifier. This gain control may likewise be ganged to the control shaft 4—10, and may be provided with a variable gain function so that the effect of the variable ratio of the voltage applied to the amplifier, at resistor 11, to that across the output terminals 5 and 6, may be nullified in its effect upon the feedback ratio of the stabilizer system.

It is to be further noted that the use of the ganged variac and potentiometer provides a variational signal voltage to the feedback amplifier system which becomes a larger fraction of the output voltage in proportion to the rotation of the potentiometer 10, toward its low voltage range. This effects stabilization of the output voltage by providing a variational output voltage component which is substantially a constant fraction of the total D. C. output voltage rather than of constant variational amplitude. This feature is of considerable advantage in providing minimum variation of output voltage at all D. C. levels within the variable range of the system.

As to the operation of the particular D. C. amplifier circuit shown the voltage regulator tube 22 establishes a reference potential which is applied through the cathode follower section on the right hand side of tube 15 to obtain an automatically compensated stabilized D. C. potential across resistor 19. The same is developed across resistor 27 when the voltage regulator tubes 28 establish a reference potential, the cathode follower in this case being the left hand section of tube 23. The resistance combination 29—30 in this second case will allow the proper voltage to be applied to the control electrode 21. Thus the left side of tube 23 and the right hand side of tube 15 are used to provide sources of closely fixed reference potentials across resistors 19 and 27 and therefore to provide the D. C. amplifier with remarkable stability and high gain.

Resistors 17 and 26 with their associated capacitors comprise a parasitic suppressor circuit to prevent a state of oscillation at some audible or superaudible frequency.

Fig. 2 shows a simplified version of the circuit previously described, wherein the variable input transformer 4 is connected to a first power supply 3 having its B— connected to output terminal 5, and having a triode regulator tube 7 connected in series with the B+ lead and the output terminal 6. A capacitor 9 or other voltage regulating device is connected across the output terminals 5 and 6, as is also the series resistor combination 10, 11 and 12. The potentiometer 10 has its control ganged with that of the input transformer 4. A second triode 15, having its input electrode 20 connected to resistor 11, is shunted across a second D. C. power supply 18, through the battery 39, from its cathode and a load resistor 16, from its anode, the latter connection being to the common B+ terminal 6 of both power supplies. Connection is made from the load resistor 16, to the input electrode 24, of a third triode which is similarly connected to the second power supply through its load resistor 25, and its battery 37. The output from the load resistor 25 is connected to the control electrode 8 of the series regulator tube to complete the circuit.

Operation is identical with that of the circuit shown in Fig. 1 except that the reference voltage to tubes 15 and 23 is provided by batteries or other means rather than current flow in the corresponding resistors of Fig. 1.

The circuit shown in Fig. 3 offers the additional concept, for reasons already set out above, of providing a variable gain control 32 to the D. C. amplifier and mechanically ganging such control to the variac 4 and the potentiometer 10.

Constant output impedance can be readily maintained in this manner by selecting a resistance variation function of the gain control 32, which exactly counteracts the effect of changing impedance of the output circuit upon varying the output voltage.

Accordingly, the objects of my invention are realized in the described power supply system which provides a variable output voltage and simultaneously affords a stable voltage at any output voltage level within a large range by means of jointly changing the input voltage and the characteristics of the voltage stabilizing circuit, however it is to be recognized that there are certain modifications which may be made to my disclosure which will not depart from the spirit of my invention and that the particular embodiments are given for purposes of illustrating the nature and operation of my invention.

Having thus fully disclosed the nature and operation of my invention in my preferred embodiments, I wish to obtain by Letters Patent and claim:

1. A stabilized power supply system comprising in combination, a first source of direct current having a variable input voltage control; a first discharge device having a control electrode serially connected in one output lead of said direct current source in such direction that discharge current normally flows; a second source of direct current having one output terminal connected in common to said discharge device at a point most remote from said first supply, the polarity of said connected output terminal of said second source being of the same polarity as said output lead of said first source in which said discharge device is connected; output voltage terminals connected to said common connection and the other of said output leads of said first source; a voltage stabilizing device connected across said output terminals; a variable impedance connected across said output terminals; a ganged control operating said variable input voltage and said variable impedance; a second discharge device having a control electrode which electrode is connected to said variable impedance; an essentially constant reference potential connected in the discharge path of said second discharge device; an output impedance connected in said discharge path of said second discharge device; a circuit connecting said discharge path in shunt with said second source; a third discharge device having a control electrode which electrode is connected to said output impedance of said second discharge device; an essentially constant reference potential connected in the discharge path of said third discharge device; a circuit connecting said discharge path of said third tube in shunt with said second source; and connections between said output impedance of said third discharge device and said control electrode of said first discharge device.

2. A stabilized power supply system having a variable output level comprising in combination; a D. C. power supply with a variable output voltage control having its output voltage applied at a pair of output terminals; a series regulator device having a control electrode, said device being connected serially between said power supply and one of said terminals; an output resistance connected between said terminals, a portion of which is variable; a D. C. amplifier comprising two discharge devices of at least three elements including a control element having a common cathode resistance; an essentially constant voltage applied between the most remote end of said cathode resistance from said devices and said control element of a first of said discharge devices thus providing a corresponding current flow and reference potential in said cathode resistance; a second supply voltage; a connection directly to said supply from the anode of said first device; a load impedance connecting the anode of the second of said devices to said supply; connections completing the discharge path of both said devices through said second supply from said remote end of said cathode resistance; input connections to said control electrode of said second device from part of said output resistance; connection between said load impedance and said control electrode of said regulator device; and a ganged connection between said variable control and said variable portion of said output resistance.

3. The system described in claim 2 in which a series impedance is connected in shunt with said load impedance to suppress parasitic oscillations.

4. A voltage stabilization system comprising in combination; a D. C. power supply having a variable output voltage control and output terminals; a discharge device with a control element, said device being connected in series with one output lead from said supply to said terminals; a resistance connected across said terminals, one portion of which is variable; a D. C. amplifier with a variable gain control; input connections to said amplifier from said resistance; output connections from said amplifier to said control element; and a ganged connection operating said variable control, said variable resistance portion and said variable gain control simultaneously.

5. A voltage stabilizing system comprising in combination, a D. C. voltage source having a variable voltage control and two output leads whereby the output voltage across said leads may be varied; a pair of output terminals for said system, a regulating device having a control electrode, said device being connected in series with one of said leads and one of said output terminals, the other of said output terminals being connected to the other of said leads; an impedance connected across said output terminals, at least part of said impedance being variable; a D. C. amplifier having its input connected across a portion of said impedance and having its output applied to said control electrode, said D. C. amplifier having a gain control ganged with said variable impedance and said variable voltage control whereby simultaneous changes in the ganged voltage control, gain control, and variable impedance control result in maintaining the voltage and feedback ratios at predetermined values for the particular setting of said controls.

ALBERT W. FRIEND.

REFERENCES CITED

The following references are of record in the file of this patent:

UNITED STATES PATENTS

| Number | Name | Date |
|---|---|---|
| 2,318,644 | Tubbs | May 11, 1943 |